United States Patent [19]
Belde et al.

[11] 3,947,287
[45] Mar. 30, 1976

[54] AQUEOUS PIGMENT DISPERSIONS

[75] Inventors: Horst Belde; Knut Oppenlaender; Ewald Daubach; Rolf Fikentscher, all of Ludwigshafen, Germany

[73] Assignee: Badische Anilin- & Soda-Fabrik Aktiengesellschaft, Ludwigshafen (Rhine), Germany

[22] Filed: Dec. 12, 1973

[21] Appl. No.: 424,175

Related U.S. Application Data

[63] Continuation-in-part of Ser. No. 303,624, Nov. 3, 1972, Pat. No. 3,841,888.

[30] Foreign Application Priority Data
Nov. 15, 1971 Germany............................ 2156603
July 27, 1972 Germany............................ 2236906

[52] U.S. Cl. ............................................ 106/308 Q
[51] Int. Cl.$^2$ ...................... B01F 17/42; C09C 3/08
[58] Field of Search................... 106/308 Q, 288 Q

[56] References Cited
UNITED STATES PATENTS

| | | | |
|---|---|---|---|
| 3,094,499 | 6/1963 | Gassmann et al............... | 106/308 Q |
| 3,451,835 | 6/1969 | Ganter et al..................... | 106/308 Q |

FOREIGN PATENTS OR APPLICATIONS

| | | | |
|---|---|---|---|
| 262,665 | 1/1962 | Australia......................... | 106/308 Q |

*Primary Examiner*—Winston A. Douglas
*Assistant Examiner*—J. V. Howard
*Attorney, Agent, or Firm*—Johnston, Keil, Thompson & Shurtleff

[57] ABSTRACT

An aqueous pigment dispersion which contains (a) pigment, (b) a water-soluble surfactant and water and a water-retaining agent in which (b) is a reaction product of a polyhydroxyl compound with from 3 to 50 moles of propylene oxide and from 2 to 70 moles of ethylene oxide per equivalent of hydroxyl. The dispersions give bright and deep-shade emulsion paints or distempers containing cellulose ethers.

7 Claims, No Drawings

AQUEOUS PIGMENT DISPERSIONS

This application is a continuation-in-part of our application Ser. No. 303,624 filed Nov. 3, 1972, now U.S. Pat. No. 3,841,888.

The invention relates to aqueous pigment dispersion which are outstandingly suitable for coloring aqueous emulsion paints or distempers containing cellulose ethers.

Aqueous pigment paints containing binders such as emulsion paints, wallpaper colors or distempers as a rule contain white pigments such as titanium dioxide, lithopone and chalk, extenders such as China clay, very finely ground dolomite, calcite, barite and/or talc, surfactants such as ethylene oxide adducts of phenols or alcohols or anionic surfactants and binders such as starch, dextrin, vegetable glue, bone glue and/or other animal glues and/or aqueous dispersions of film-forming homopolymers or copolymers such as those of acrylic esters, methacrylic esters, acrylic acid, styrene, butadiene, acrylonitrile, vinyl acetate, vinyl propionate and mixtures of the same. Water-soluble cellulose ethers such as methylcellulose and/or carboxymethylcellulose are added to the emulsion paints to improve their application properties. The viscosity and consequently the flow of white and colored emulsion paints prepared therefrom are improved by the addition of water-soluble cellulose ethers. White paints are colored with aqueous pigment dispersions, as a rule immediately prior to use. Pigment dispersions used for this purpose are prepared by homogenization or dispersion of pigments with anionic or non-ionic dispersing agents such as oxyethylated phenols or alkylphenols or oxyethylated fatty alcohols.

These dispersions are more or less extensively flocculated when stirred into the emulsion paint containing a cellulose ether so that the tinctorial strength of the pigment contained in the paint is decreased and, what is particularly disadvantageous, the shade of color is dulled.

It is an object of the present invention to provide aqueous pigment dispersions which are stable to flocculation in aqueous emulsion paints containing a cellulose ether and which will color such paints in pure shades.

We have found that fully satisfactory aqueous emulsion paints containing cellulose ethers which have pure shades of color and in which the pigment is not flocculated are obtained by using, for coloring, an aqueous pigment dispersion which contains on the bases of (a) + (b) + (c):

a. from 20 to 55% by weight of a finely divided pigment;
b. from 5 to 25% by weight of water-soluble surfactant or mixture of surfactants which has been obtained by reaction of a hydroxyl compound of the formula $$A(OH)_m$$

in which
A is an m-valent aliphatic or cycloaliphatic radical of two to 10 carbon atoms;
OH is primary or secondary hydroxyl; and
m is one of the integers from 2 to 6 with from 3 to 50 moles of propylene oxide per equivalent of primary and secondary hydroxyl followed by reaction with from 2 to 70 moles of ethylene oxide per equivalent of primary and secondary hydroxyl and c. from 40 to 75% by weight of water or a mixture of water and a water-retaining agent.

The aqueous pigment dispersions of the invention give colorations of deep and pure shade after they have been mixed with the white emulsion paint and applied, e.g. printed, and dried.

Colored inorganic and organic pigments are suitable as the pigments.

Carbon black and iron oxide are examples of inorganic colored pigments.

Examples of organic pigments are azo pigments, quinacridone pigments, anthraquinoid pigments, pigments based on perylene-3,4,9,10-tetracarboxylic acid and the corresponding diimides, phthalocyanines, halogenated phthalocyanines and oxazine pigments.

The water-soluble surfactants are obtained by the addition of propylene oxide followed by the addition of ethylene oxide to a hydroxyl compound of formula $$A(OH)_m .$$

Examples of such hydroxyl compounds are ethylene glycol, propylene glycol-1,3, propylene glycol-1,2, butanediol-1,3, butanediol-1,4, butenediol-1,4, butynediol, butanetriol, pentanediol-1,5, hexanediol-1,6, decandiol-1,10, glycerol, pentaerythritol, trimethylolpropane, sorbitol, triethanolamine, aminoethylethanolamine, triisopropanolamine, hexahydroterephthalyl alcohol, cyclohexanediol-1,4, cyclohexanediol-1,3 and mixtures of the same.

Because of their particularly great stabilizing effect the reaction products of trimethylolpropane, butanediol-1,4, triethanolamine, glycerol, pentaerythritol, aminoethylethanolamine or mixtures of the same are preferred and of these the reaction products of 8 to 20 moles of propylene oxide and 12 to 30 moles of ethylene oxide per equivalent of primary and secondary hydroxyl groups are particularly preferred.

The water-soluble surfactants are obtained by stagewise reaction of the hydroxyl compound with from 3 to 50, preferably from 8 to 20, moles of propylene oxide per equivalent of primary and secondary hydroxyl groups followed by oxyethylation of the polypropoxylated compound with from 2 to 70, preferably 12 to 30, moles of ethylene oxide per equivalent of primary and secondary hydroxyl groups. The polypropoxylated-polyethoxylated compounds to be used according to the invention are obtainable for example by the method of U.S. Pat. No. 2,979,528. The water-soluble surfactants have a molecular weight of from 1000 to 42,000, preferably from 7000 to 17,500. The proportion of terminal polyethylene oxide blocks is from 30 to 80%, preferably from 40 to 70%, by weight. Products having more than 80% by weight or less than 40% by weight of the ethylene oxide blocks do not have an adequate stabilizing effect, i.e., the colored pigments contained in the emulsion paints is flocculated.

Production of the aqueous pigment dispersion of the invention is carried out in conventional manner by dispersion or homogenization of the pigment in dry form or in the form of a press cake together with the water-soluble surfactant in a kneader, dispersion mixer, sand or Perl mill or attritor mill. Other auxiliaries such as water-retaining agents or disinfectants may be added to the mixture during the dispersion or thereafter.

The formulations of the invention not only have the said advantage of stabilizing the fine state of subdivision of the colored pigment in the aqueous emulsion paint containing cellulose ether but also the following further advantage; unlike systems which contain anionic dispersing agents or ethylene oxide adducts of fatty alcohols or phenols, the formulations of the invention are stable to drying up, i.e. there is no formation in the storage vessels of crusts or skins which fall into the pigment dispersion upon removal and which may give trouble in the colored emulsion paint in the form of specks or lumps.

The following Examples will further illustrate the invention. Parts and percentages are by weight.

EXAMPLE 1 a. 86 parts of a copper phthalocyanine blue of the α-modification is kneaded with 20 parts of a product which has been obtained by reaction of 1 mole of trimethylolpropane with 45 moles of propylene oxide and then with 49 moles of ethylene oxide in a kneader with an addition of 30 parts of a mixture (1 : 1) of water and glycol. A temperature of about 75°C is thus set up. The kneaded material is then diluted with a mixture (1 : 1) of water and ethylene glycol until the liquid formulation contains 40% of pigment 20% of glycol. To test the stability of flocculation, the paint described in Examle 1 is used. 1 part of the above aqueous dispersion is stirred into 99 parts of the paint and homogeneously dispersed. The colored emulsion system obtained is brushed or printed onto wallpaper. After drying a deep and pure blue coloration is obtained which does not exhibit any flocculation at all.

b. Comparative experiment:

Conventionally used dispersants such as the sodium salt of the condensation product of naphthalenesulfonic acid with formaldehyde, sodium salt of the acid sulfuric acid ester of ethylene oxide adducts or ethylene oxide adducts such as alkylphenol with 10 to 50 moles of ethylene oxide, fatty alcohol with 12 to 80 moles of ethylene oxide, oleylamine with 12 moles of ethylene oxide or p-benzyl-o-phenylphenol with 10 to 20 moles of ethylene oxide, polyethylene oxide or sodium lignin sulfonate are used for the production of the pigment dispersion instead of the reaction product of trimethylolpropane with propylene oxide and ethylene oxide specified as dispersant under (a). Dispersions are obtained whose pigment after having been stirred into the abovementioned paint binder flocculates out.

After having been brushed onto wallpaper and dried, cloudy and markedly paler colorations are obtained than with the pigment formulations under (a) at the same pigment concentration.

EXAMPLE 2

80 parts of C.I. Pigment Green 7, C.I. No. 74,260 and 24 parts of the reaction product of 1 mole of pentaerylthritol with 64 moles of propylene oxide and 74 moles of ethylene oxide are kneaded with an addition of 9 parts of dispropylene glycol for one hour, the temperature rising to about 100°C. The kneaded material is diluted as described in Example 11 to give a formulation containing 45% of pigment.

When a mixture of 1 part of the formulation and 99 parts of the paint described in Example 1(a) is brushed onto wallpaper, a deep and pure blue coloration is obtained in which no flocculation can be detected.

EXAMPLE 3

60 parts of C.I. Pigment Yellow 1, C.I. No. 11,680 and 14 parts of the reaction product of 1 mole of glycerol with 68 moles of propylene oxide and 74 moles of ethylene oxide are processed as described in Example 1 into a liquid formulation containing 45% of pigment.

1 part of the formulation is stirred into 99 parts of the paint described in Example 1(a). Deep colorations are obtained in which no flocculation can be detected.

EXAMPLE 4

86 parts of a copper phthalocyanine of the α-modification and 20 parts of the reaction product of 1 mole of trimethylolpropane with 45 moles of propylene oxide and 69 moles of ethylene oxide is kneaded with the addition of a mixture (1 : 1) of water and glycol, the temperature rising to about 75°C. The kneaded material is then diluted with water and glycol so that a formulation is obtained which contains 40% of pigment and 20% of glycol.

This formulation does not exhibit any flocculation in the paint of Example 1(a).

EXAMPLE 5

60 parts of a copper phthalocyanine of the β-modification and 14 parts of the reaction product of 1 mole of butanediol-1,4 with 56 moles of propylene oxide and 50 moles of ethylene oxide are kneaded as described in Example 1 and diluted to a formulation containing 40% of pigment.

The formulation does not show any flocculation in the paint of Example 1(a).

EXAMPLE 6

80 parts of carbon black having a surface area (BET method) of 83 m$^2$/g, 20 parts of the reaction product of 1 mole of hexanediol-1,6 with 70 moles of propylene oxide and 74 moles of ethylene oxide, and 41 parts of a mixture (1 : 1) of water and dipropylene glycol are kneaded as described in Example 7, the temperature rising to about 70°C. The kneaded material is then diluted to a pigment formulation which contains 35% of carbon black.

By adding this to the paint of Example 1(a) a formulation is obtained which is of pure shade and gives strong colorations on paper.

EXAMPLE 7

80 parts of C.I. Pigment Violet 23, C.I. No. 51,319 is kneaded with 20 parts of the reaction product of 1 mole of decanediol-1,10 with 70 moles of propylene oxide and 74 moles of ethylene oxide for thirty minutes with the addition of about 30 parts of water in a kneader, the temperature rising to about 65°C. The kneaded material is diluted to a paste containing 35% of pigment.

Mixtures of this paste with the paint of Example 1(a) give deep colorations on wallpaper and no flocculation can be detected.

We claim:

1. An aqueous pigment dispersion which does not flocculate in a cellulose-ether-containing emulsion paint or distemper which contains, with reference to the total weight of (a) + (b) + (c),
    a. from 20 to 55% by weight of a finely divided pigment;

b. from 5 to 25% by weight of a water-soluble surfactant or mixture of surfactants obtained by reaction of a hydroxyl compound of the formula: $A(OH)_m$ in which A is an m-valent aliphatic or cycloaliphatic radical of two to 10 carbon atoms, OH is primary or secondary hydroxyl; and $m$ is one of the integers from 2 to 6;

with from 3 to 50 moles of propylene oxide per equivalent of primary and secondary hydroxyl and then with from 2 to 70 moles of ethylene oxide per equivalent of primary and secondary hydroxyl and c. from 40 to 75% by weight of a mixture of water and a waterretaining agent.

2. An aqueous pigment dispersion stable to flocculation according to claim 1 characterized by a content of surfactant (b) which has been obtained by reaction of a hydroxyl compound with from 8 to 20 moles of propylene oxide per equivalent of primary and secondary hydroxyl followed by reaction with 12 to 30 moles of ethylene oxide per equivalent of primary and secondary hydroxyl.

3. An aqueous pigment dispersion stable to flocculation according to claim 1 characterized by a content of surfactant (b) which has been obtained by reaction of trimethylolpropane, butanediol-1,4, glycerol, triethanolamine, pentaerythritol, N-(aminoethyl)-ethanolamine or a mixture thereof with from 8 to 20 moles of propylene oxide and 12 to 30 moles of ethylene oxide per equivalent of hydroxyl.

4. An aqueous pigment dispersion stable to flocculation according to claim 1, characterized by a content of surfactant (b) which has been obtained by reaction of 1 mole pentaerythritol with 64 moles propylene oxide and 74 moles ethylene oxide.

5. A pigment dispersion stable to flocculation according to claim 1 wherein (a) is an inorganic pigment.

6. A pigment dispersion stable to flocculation according to claim 1 wherein (a) is an azo pigment, quinacridone pigment, anthraquinoid pigment, a pigment based on perylene-3,4,9,10-tetracarboxylic acid, a phthalocyanine, polychlorophthalocyanine, polybromochlorophthalocyanine or oxazine pigment.

7. A pigment dispersion stable to flocculation according to claim 1 wherein said hydroxyl compound is selected from the group consisting of ethylene glycol, propylene glycol-1,3, propylene glycol-1,2, butanediol-1,3, butanediol-1,4, butenediol-1,4, butynediol, butanetriol, pentanediol-1,5, hexanediol-1,6, decandiol-1,10, glycerol, pentaerythritol, trimethylolpropane, sorbitol, triethanolamine, aminoethylethanolamine, triisopropanolamine, hexahydroterephthalyl alcohol, cyclohexanediol-1,4, cyclohexanediol-1,3 and mixtures thereof.

* * * * *